(12) United States Patent
Illingworth

(10) Patent No.: US 6,282,111 B1
(45) Date of Patent: Aug. 28, 2001

(54) INVERTER CONTROL USING CURRENT MODE SLOPE MODULATION

(75) Inventor: Lewis Illingworth, Kensington, NH (US)

(73) Assignee: Avionic Instruments INC ( * ) Notice: Subject to any disclaimer, the term of this patent is extended or adjusted under 35 U.S.C. 154(b) by 0 days.

(21) Appl. No.: 09/335,977

(22) Filed: Jun. 18, 1999

(51) Int. Cl.$^7$ .......................... H02M 3/24; H02M 7/5387
(52) U.S. Cl. ............................................. 363/98; 363/132
(58) Field of Search .................. 363/98, 95, 97, 363/131, 132, 71, 54, 37; 323/281, 275, 222

Primary Examiner—Rajnikant B. Patel
(74) Attorney, Agent, or Firm—Ward & Olivo

(57) ABSTRACT

A power inverter capable of both DC-AC and DC-DC conversion is disclosed. Said inverter features a novel current mode slope modulation scheme to regulate output while eliminating stability problems commonly held by current mode systems. Furthermore, an embodiment is disclosed utilizing three state modulation to reduce switching losses in the power stage thereby increasing efficiency. Additionally, a novel sine wave compression circuit is disclosed to prevent output wave clipping under low DC supply conditions.

14 Claims, 10 Drawing Sheets

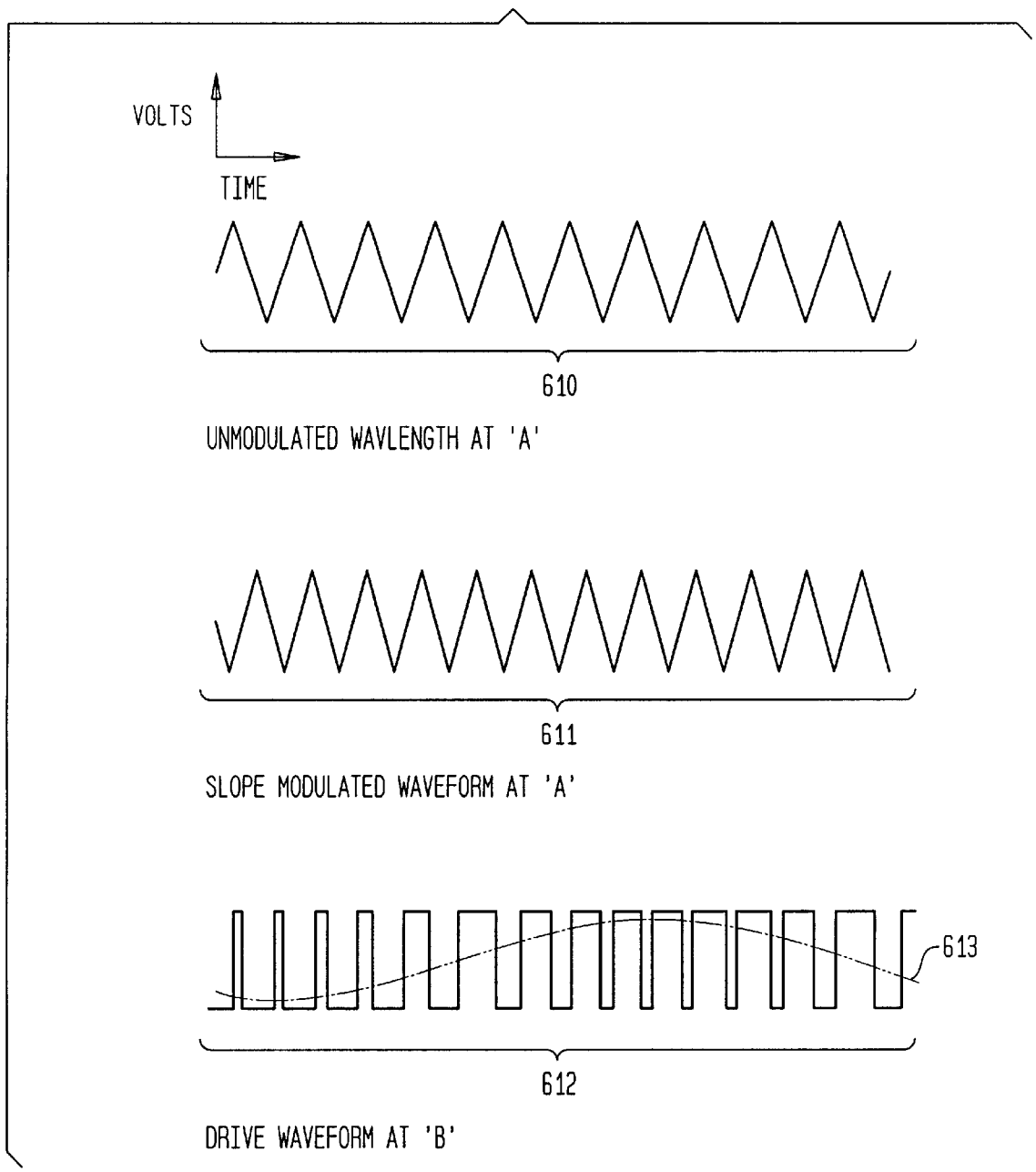

INVERTER CONTROL USING CURRENT MODE SLOPE MODULATION

TECHNICAL FIELD OF THE INVENTION

The present invention relates to power inverters and DC to DC converters and, more specifically, to both improved power inverters and DC to DC converters operating in current mode utilizing a novel slope modulation regulation scheme.

BACKGROUND OF THE INVENTION

Inverters change one type of electrical current into another. There exist two types of electrical current, direct current (DC) and alternating current (AC). The electricity commonly available in mobile situations via batteries or generated via alternative means, e.g., wind generators or solar panels, is DC. DC can be easily stored using well known means such as batteries or capacitors. To be used with common appliances and other wall-powered devices, DC must be converted to AC.

Direct current is current which flows in the same direction at all points in time. If one were to measure the voltage of a DC circuit at different instants in time, the measurement would remain constant. As mentioned, the advantage of DC is that it is easy to store.

Alternating current is current which periodically reverses its direction of movement over various periods of time. If one were to measure the voltage of an AC circuit at different instants in time, the voltage would fluctuate, being in a cycle of continuous reversal. In the U.S. this cycling occurs 60 times per second, i.e., 60 Hz. The advantages of AC are that it is very easy to step voltages up or down (through transformers) and thus easier to distribute over long distances with smaller wire than would be possible with DC. This is because as electricity is carried, energy is thermally dissipated due to the resistance of the wire. However, the relative loss decreases as the voltage increases.

As mentioned previously, DC must be converted into AC to power appliances and other wall powered devices. This is the role inverters play. Many methods of DC to AC conversion are well known in the art. However, they all present serious shortcomings that the present invention addresses in a novel fashion.

One method known in the art for DC to AC conversion and DC to DC conversion is voltage controlled pulse width modulation. High frequency switched DC to AC inverters generally use a voltage controlled pulse width modulation scheme such as the system 100 exemplified in FIG. 1 (FIG. 1) wherein DC current enters at terminals 108 and AC current leaves at terminals 109. This system has a full bridge configuration of switching transistors and commutating diodes 106. Said bridge could, for example, comprise transistors of type Bipolar, IGBT (insulated gate bipolar transistor), MOSFET (metal-oxide semiconductor field effect transistor), or gate controlled SCR (silicon controlled rectifier). Said bridge is then connected to an LC (inductor and capacitor) output filter 107. The semiconductors are enabled by conventional drive circuitry 105. The circuit operates by pulse width modulating a constant frequency drive to the switching transistors in such a way that the average output from them, when smoothed by the LC filter 107, is the required low frequency sine wave.

A sawtooth generator 102 provides a constant frequency constant amplitude sawtooth ramp signal derived from a conventional relaxation oscillator operating at the required high switching frequency. A low voltage reference sine wave is generated by 101 by conventional means and has a peak to peak amplitude slightly less than that of the sawtooth ramp. In the case of a DC to DC converter the sine wave reference is replaced by a DC voltage reference.

The sine wave or DC voltage reference and sawtooth reference are then compared by a conventional analog comparator 104 which acts here as a pulse width modulator to generate a pulse width modulated logic level signal which if passed through a low pass filter will accurately reproduce the sine wave or DC reference. The modulated signal is then buffered and isolated by the transistor drive circuits 105 for connection to the bridge power switching transistors and commutating diodes 106. An LC filter 107 removes high frequency components to leave a low frequency sinusoidal or DC voltage output.

However, line and load regulation are quite poor with this type of circuit. One method to improve the regulation is shown with the addition of an output meter 103 which produces a DC error signal to control the sine wave reference output voltage. Such control is by its very nature slow and reacts poorly to switched and non linear loads. Other output correction schemes have an error amplifier connected in the same way as for a DC to DC converter but in this case the phase shift caused by the LC output filter 107 is considerable, even at the low output frequency, and it is hard or impossible to achieve the high loop gain that is necessary for good performance when the inverter or DC to DC converter drives non-linear or pulsed loads.

Another method well known in the art for DC to AC or DC to DC conversion is current mode with pulse width modulation. FIG. 2 (FIG. 2) shows a modification of the voltage controlled pulse width modulated system 200 to allow current mode control wherein DC current enters at terminals 108 and AC or DC current leaves at terminals 109. A current sense point 201 is inserted between the switching power transistors 106 and the LC output filter 107 to provide a reference voltage proportional to the instantaneous current. In this system the inverter or DC to DC converter output voltage at terminals 109 is compared to a reference sine wave by an error amplifier 202. The intention is to make the current flowing through the power switches 106 proportional to this error voltage and as a consequence the power stage becomes a high impedance current source; the output inductor impedance is absorbed into the high impedance source and thus the maximum phase shift through said filter 107 is now only 90 degrees compared to 180 degrees for a voltage control system.

The error voltage from the error amplifier, or voltage comparator 202 as it is often referred to in a current controlled system, is compared with the current reference signal in the current comparator 203 to produce a current error signal. This signal is now compared with a high frequency sawtooth reference by comparator/pulse width modulator 104 and the high frequency digital output is connected to the transistor drive circuits 105 as in the above disclosed voltage controlled pulse width modulated inverter 100.

The resulting system provides true current mode control but unfortunately inherits the enormous disadvantage of an inherent form of instability known as "subharmonic oscillation" that is prevalent in current mode systems for which the duty cycle is either more or less than 50% depending on the configuration. As an inverter requires pulse widths between 0% and 100% of the duty cycle the problem is unavoidable with this type of control.

In practice the effects of subharmonic oscillation do not become significant until the output filter inductor is made small and the high frequency components of the inductor current exceed 5% of the maximum current. This restriction makes the system unsuitable for very small, lightweight inverters.

Another method known in the art for DC to AC inverters is hysteretic current control. High performance high frequency switching inverters and DC to DC converters require gain around the control loop at frequencies many multiples of the baseband sine wave. This is particularly true in the case of inverters driving non-linear loads such as diode rectifiers with capacitor filters for which a high loop gain at frequencies greater than ten or twenty times the baseband frequency is essential if the waveform distortion is to be minimized. Hysteretic current control achieves such performance without becoming prone to subharmonic oscillations. Unfortunately it does not work well at switching frequencies above 50 kHz where circuit delays and power component switching times become so long that circuit currents change significantly between the time that a specific current level is measured and the actual change of state in the power circuits.

An alternate solution to hysteretic current mode control has been achieved via the present invention by adapting the current mode control inverter with pulse width modulation in such a way that eliminates the possibility of subharmonic oscillations. This is achieved by a pulse width modulation scheme that is not constrained in time.

The systems previously described, both prior art and what has to this point been disclosed, have featured two state modulation. FIG. 3A shows the operation of a two state bridge power stage 400 in detail. Q1, Q2, Q3, and Q4 are the switching elements and L and C form the output low pass filter 107. The drive circuits are connected so that at one time Q1 and Q4 are switched on with Q2 and Q3 switched off. In the other switching phase, Q1 and Q4 are switched off with Q2 and Q3 switched on. Thus, referring to FIG. 3B, the voltage at D mirrors that at C and the switching losses are identical for both bridge halves, Q1, Q2 and Q3, Q4. These losses are considerable and can be minimized if one side of the bridge Q1, Q2 switches at the low output frequency while the other side Q3, Q4 switches at the high switching frequency. This is known as "three state" switching. An embodiment of the present invention will be disclosed utilizing three state switching as a means to higher efficiency.

All of the inverter circuits disclosed have yet another problem addressed by a further embodiment of the present invention. When an AC generator is brought on line or incurs an overload its output voltage falls but retains its sinusoidal quality, although the frequency may change. DC to AC inverters that are controlled by a sine wave reference signal, however, retain their frequency but suffer from a clipping of the tops and bottoms of their waveforms. Clipped waveforms are undesirable because they lead to unacceptably high levels of harmonics of the baseband frequency that can cause overheating in electrical machines and also high frequency emissions. To address these concerns, a sine wave compression circuit will be disclosed.

In view of the foregoing, clearly there exists a need for an improved power inverter and DC to DC converter that addresses the shortcomings of the prior art, e.g., poor regulation, instability, and inefficiency.

SUMMARY OF THE INVENTION

The first embodiment of the present invention retains several functions of previously disclosed current controlled inverter or DC to DC converter with pulse width modulation 200 (see FIG. 2.) Sine wave generator 101, error amplifier 202, difference amplifier 203, and drive circuits 105 all operate as previously disclosed. However, the sawtooth generator 102 and comparator/pulse width modulator 104 are replaced with a new circuit that pulse width modulates by varying the rise and fall times of a sawtooth generator.

Such a pulse width modulation system is not constrained in time and by allowing the frequency to vary there is no susceptibility to subharmonic oscillation. It has advantages over hysteretic current mode operation in that noise components in the current sense and current command signals, which cause enormous problems in hysteretic control, are to a great degree eliminated. This is because the control signals are currents that charge the timing capacitor.

Furthermore, this novel modulation scheme allows the present invention to be used as a DC-DC converter as well as an inverter. To effect DC-DC conversion the sine wave reference signal is simply replaced with a DC reference signal.

To address the efficiency losses incurred in switching, another embodiment is disclosed utilizing three state modulation. Briefly returning to FIG. 3A, the switching losses incurred by Q1, Q2 and Q3, Q4 are considerable. These switching losses are reduced by switching one side of the bridge Q1, Q2 at the low output frequency while the other side Q3, Q4 switches at the high switching frequency. The drive circuits are changed so that now Q1, Q2 are enabled by a low speed switching signal and the transistors associated with high speed switching Q3, Q4 are enabled by a high speed switching signal.

As previously disclosed, when DC input sags, the output waveform of a conventional sine wave referenced inverter clips. This causes numerous problems for the attached device. These problems are overcome by constraining the sine wave reference amplitude proportional to the inverter DC input voltage when the DC level is below that required to sustain an undistorted output. FIG. 4 shows typical inverter AC output voltages with DC input levels below that necessary for an undistorted output; the tops and bottoms of the sine waves are clipped off. FIG. 5 shows comparative waveforms for a system using sine wave reference compression in which the output is always sinusoidal with the maximum value that can be achieved for any particular input. Once the DC voltage reaches and passes that necessary for the specified output, the output is maintained at a constant level.

Thus, it is an object of this invention to provide an improved power inverter.

It also an object of this invention to provide an improved DC-DC power converter.

It is yet another object of this invention to provide an improved power inverter utilizing current mode control using slope modulation.

Additionally, another object of this invention is to provide an improved DC-DC power converter utilizing current mode control using slope modulation.

It is a further object of this invention to provide an improved power inverter utilizing current mode control using slope modulation further utilizing three state modulation.

In addition, it is an object of this invention to provide an improved power inverter utilizing current mode control using slope modulation further utilizing sine wave reference compression.

Furthermore, it is an object of this invention to provide an improved power inverter utilizing current mode control using slope modulation further utilizing three state modulation and further utilizing sine wave reference compression.

BRIEF DESCRIPTION OF THE DRAWINGS

The present invention is best understood with reference to the detailed description below, which is intended to be read in conjunction with the set of drawings, wherein:

FIG. 6B (FIG. 6B) depicts exemplary waveforms constituent to the present invention;

DETAILED DESCRIPTION OF THE PREFERRED EMBODIMENTS

Figure 1:
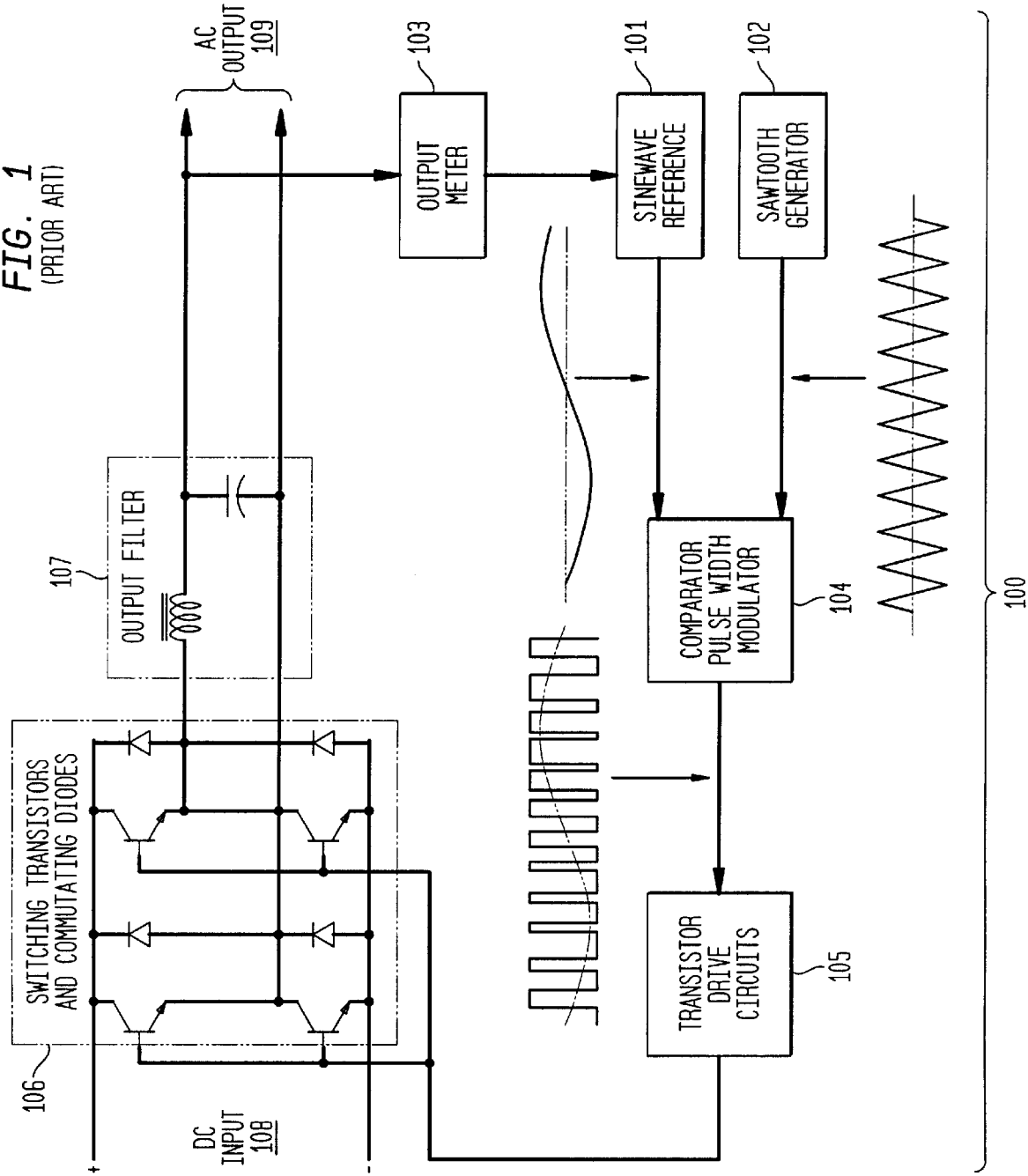
FIG. 1 (FIG. 1), above disclosed, is a combination block and schematic diagram of a voltage controlled inverter with pulse width modulation.
Figure 2:
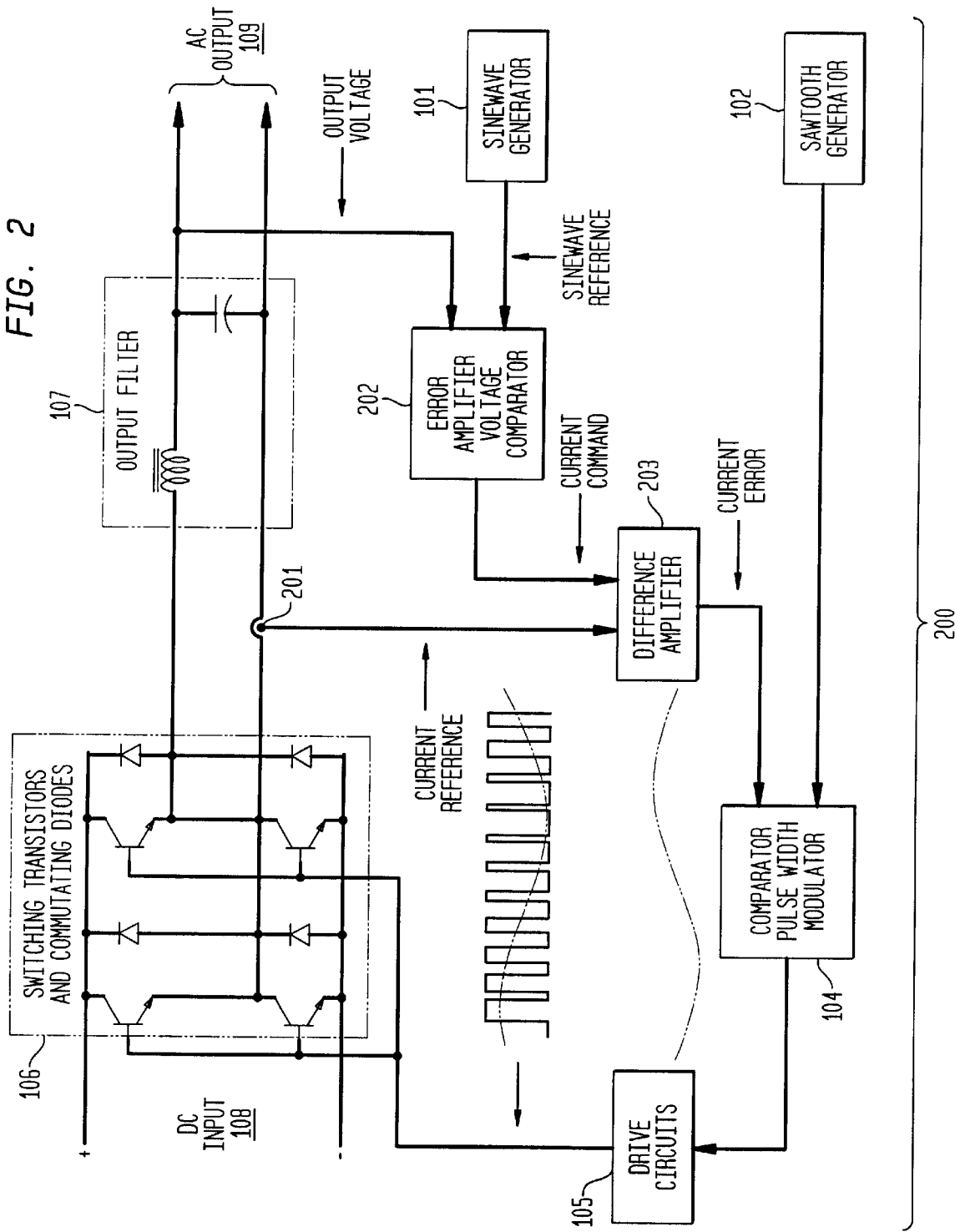
FIG. 2 (FIG. 2), above disclosed, is a combination block and schematic diagram of a current controlled inverter with pulse width modulation.
Figure 3A:
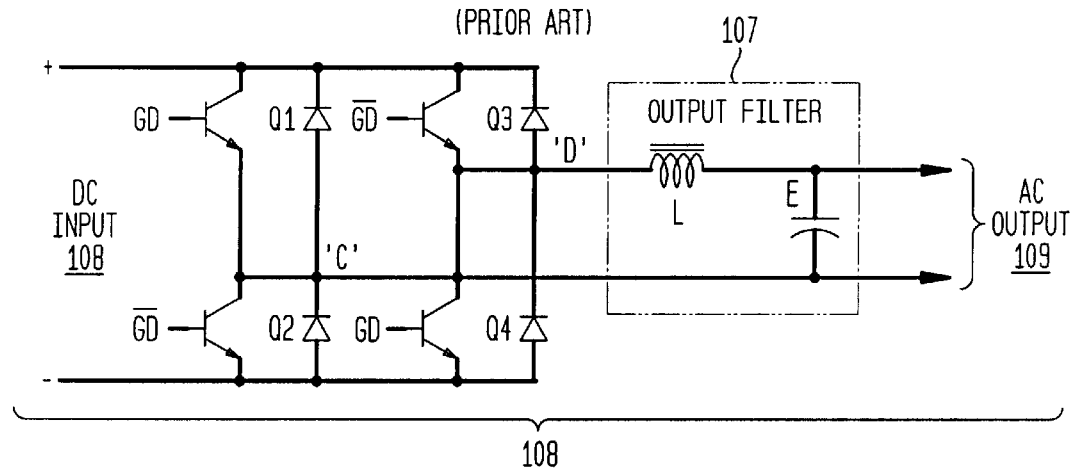
FIG. 3A (FIG. 3A), above disclosed, depicts a two state modulation circuit.
Figure 3B:
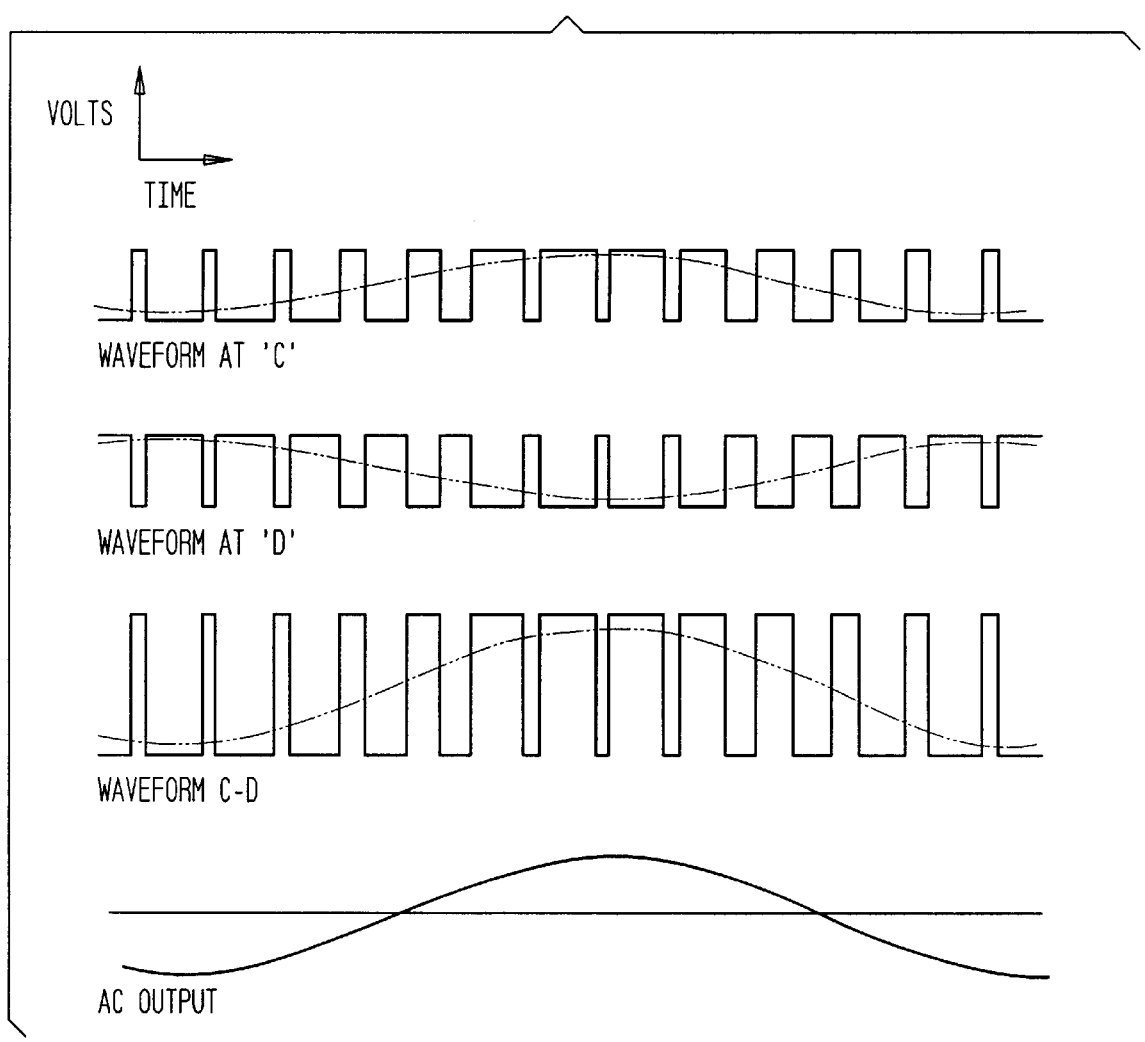
FIG. 3B (FIG. 3B), above disclosed, depicts exemplary waveforms of said two state modulation circuit.
Figure 4:
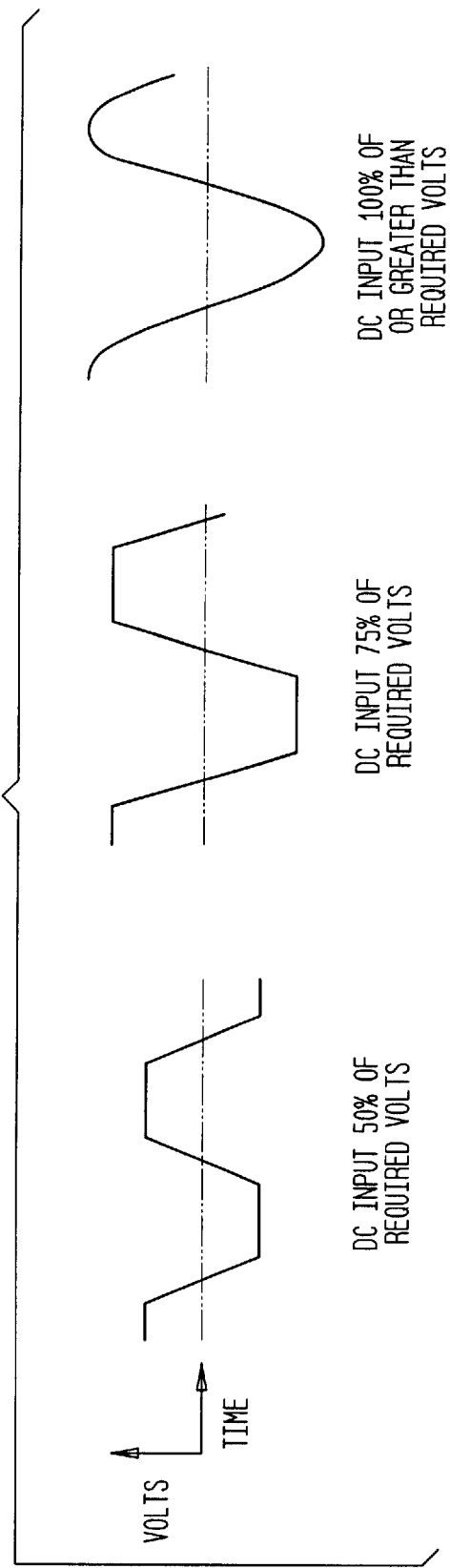
FIG. 4 (FIG. 4), above disclosed, depicts waveforms exemplary of prior art inverters with insufficient and sufficient DC input voltage.
Figure 5:
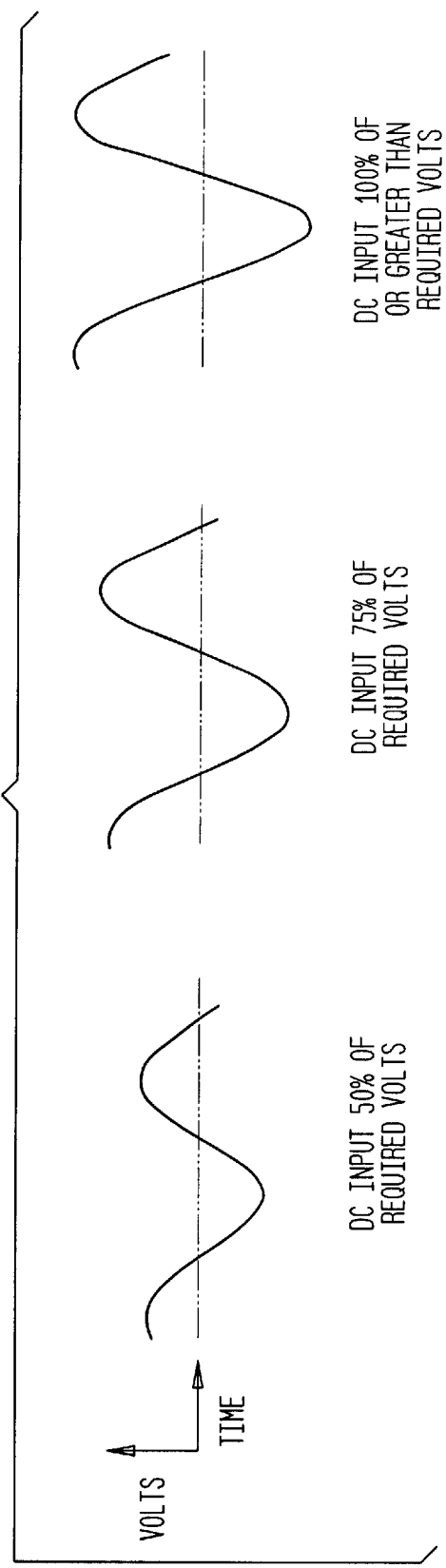
FIG. 5 (FIG. 5), above disclosed, depicts waveforms exemplary of an inverter in accordance with the present invention using sine wave reference compression with varying degrees of DC input voltage.
Figure 6A:
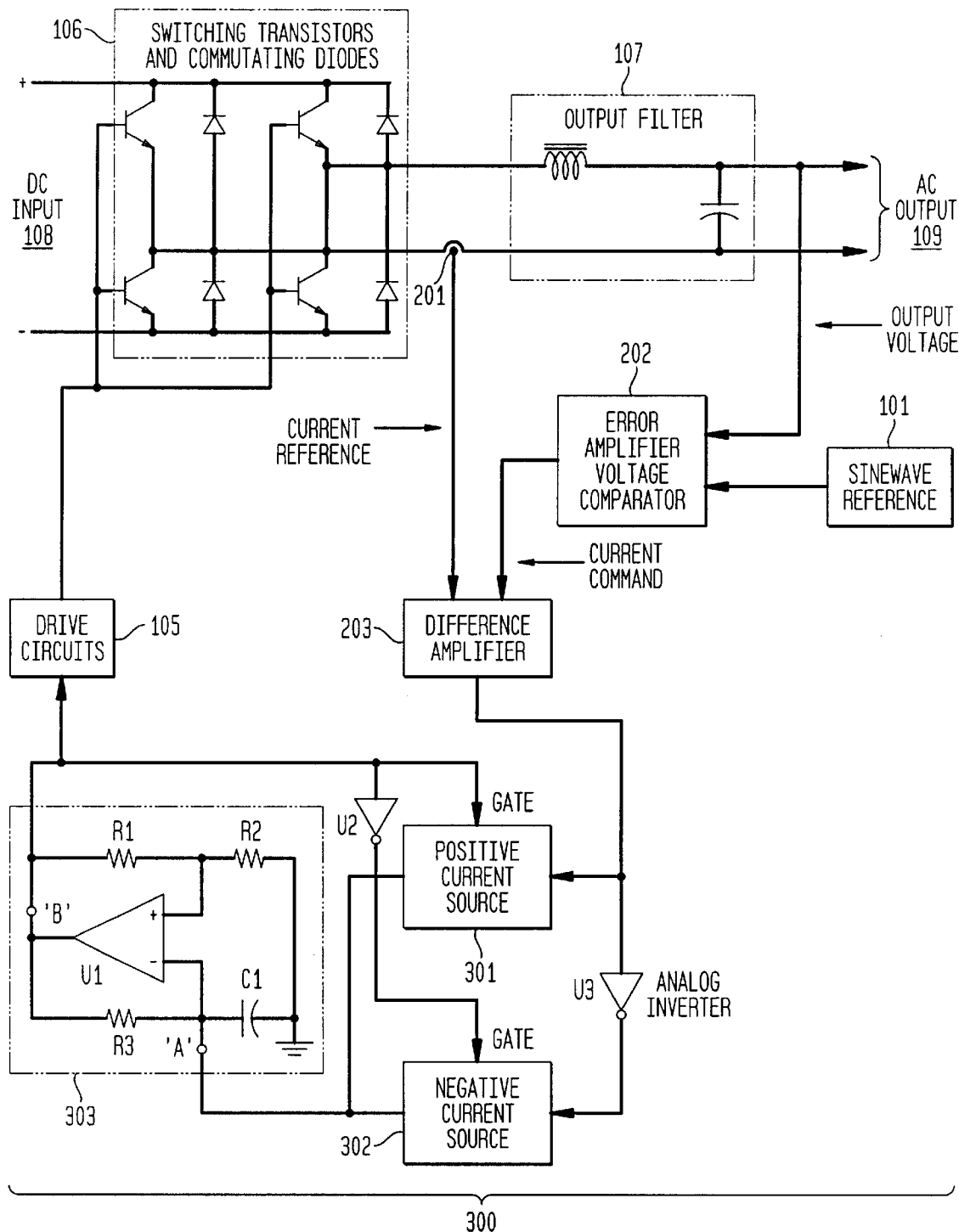
FIG. 6A (FIG. 6A) is a combination block and schematic diagram of a current controlled inverter with slope modulation in accordance with the present invention.

The invention currently disclosed will now be described with reference to the drawings wherein FIG. 6A (FIG. 6A) schematically depicts a first embodiment of a power inverter 300 in accordance with the present disclosure.

The heart of system 300 is a multivibrator 303 with comparator U1 and components R1, R2, R3, and C1. Values are chosen for operations at the nominal switching frequency, and the logic level output at point 'B' is a square wave with a 50-50 duty cycle. This oscillator is modulated by speeding up either the rise time or fall time depending on whether the inverter output is to go positive or negative. Speeding up the rise time will result in a reduction in the time that 'B' is positive compared with the negative duration. This pulse width modulation results in the inverter output being taken negative. Conversely speeding up the fall time results in a reduction in the time that 'B' output is negative compared with the nominal positive duration and the resulting pulse width modulation carries the inverter output positive. The charging rates are controlled by two current sources, one to pull positive 301 and one to pull negative 302. The currents are made proportional to the positive or negative output from the current difference amplifier 203. These two current sources 301 and 302 are gated with U1 output so that the positive current source is only operational when C1 is charging and the negative current source is operational only when C2 is discharging. To this end, logic level inverter U2 functions to enable negative current source 302 when the positive current source 301 is disabled, and conversely, disables negative current source 302 when the positive current source 301 is enabled. Analog inverter U3 reverses the polarity of the output signal from difference amplifier 203 and in turn is connected to the negative current source 302.

Current sources 301 and 302 operate such that a negative input results in a low output current and a positive input results in a high output current. Thus, if the input to the positive current source 301 is positive, the positive current from it will rapidly charge capacitor C1. In this case the analog control signal is inverted by U3 to be a negative signal input to the negative current source 302 resulting in a low negative current to discharge capacitor C1. Capacitor C1 will therefore discharge slowly. Under these conditions signal B from multivibrator 303 is positive for a long time as capacitor C1 discharges slowly and negative for a short time as capacitor C1 charges rapidly.

FIG. 6B depicts waveforms characteristic of the present invention. Waveform 610 shows the unmodulated signal at point 'A' when the control voltages to the current sources 301 and 302 are zero. Waveform 611 depicts the signal at point 'A' when the control voltage from the difference amplifier 203 is a low frequency sine wave. Towards the left hand side a positive control voltage leads to a high current from positive current source 301 and capacitor C1 charges rapidly. The corresponding low current from negative current source 302 results in a slow discharge. The resulting output at point 'B' 612 has a short positive "on" time and a long negative "off" time. Toward the center of waveform 612, equal currents from 301 and 302 lead to equal "on" and "off" times at point 'B'. The right side of waveform 612 occurs when there is a low positive current from 301 and a high negative current from 302 leading to a long "on" time at point 'B' and a corresponding short "off" time. Waveform 612, when low pass filtered, is a low frequency sine wave as shown by the dotted line 613.

Figure 7A:
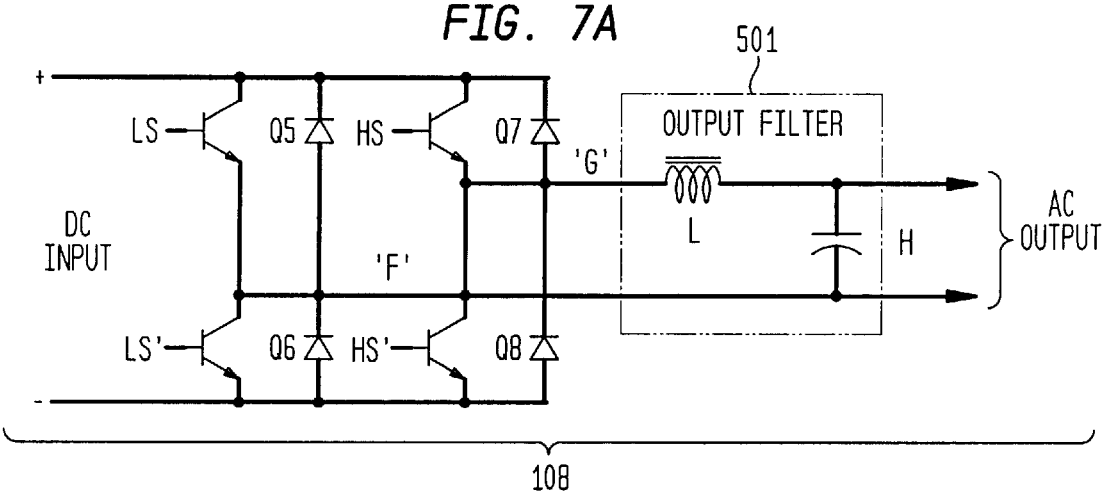
FIG. 7A (FIG. 7A) depicts a schematic of a three state modulation circuit.
Figure 7B:
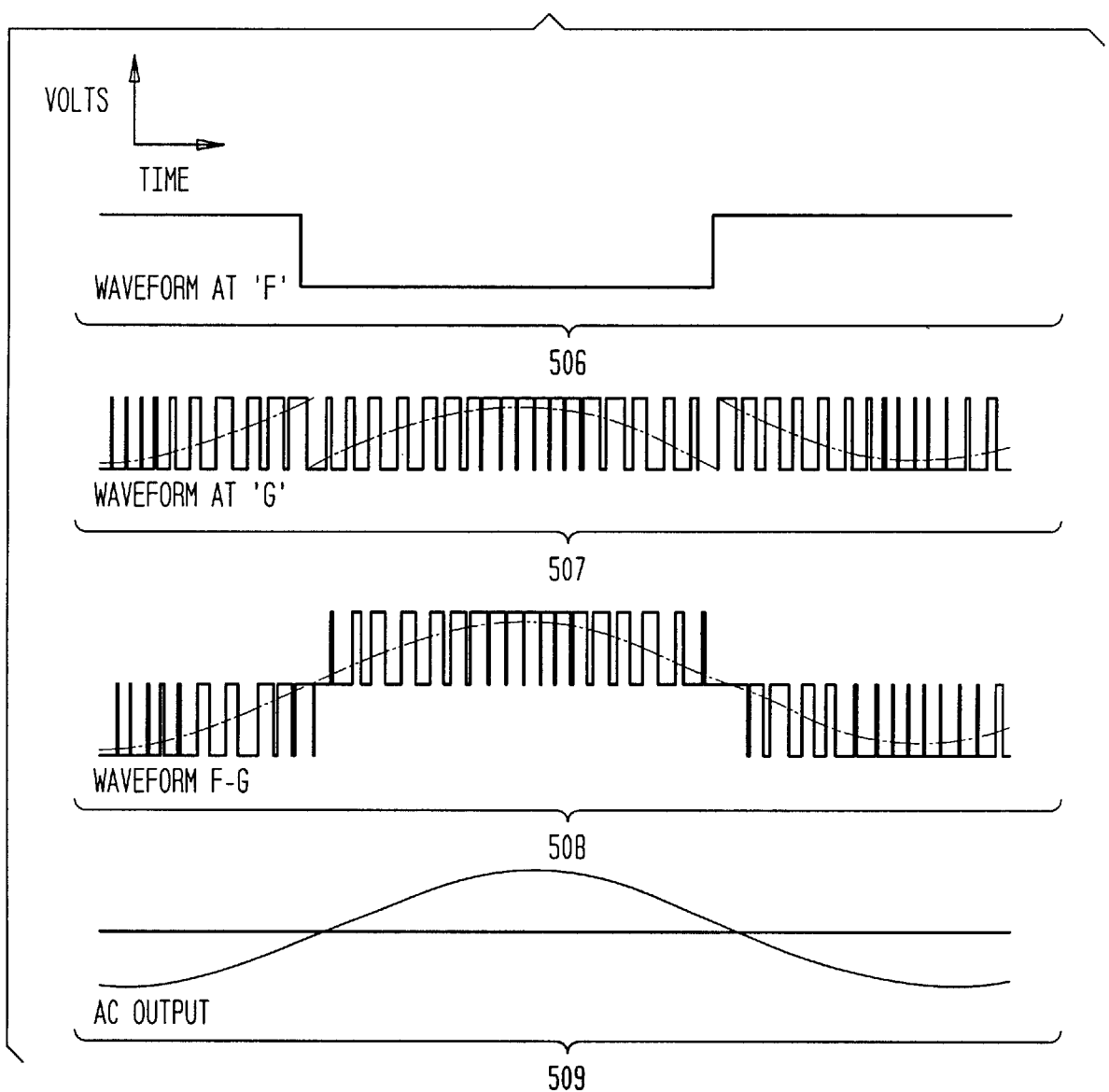
FIG. 7B (FIG. 7B) depicts waveforms exemplary of said three state modulation circuit.

The detailed description heretofore has exemplified an inverter in accordance with the present invention. A DC to DC converter can be exemplified by simply replacing sine wave reference signal 101 (see FIG. 6A) with a DC voltage reference. In accordance with an alternate embodiment of the present invention, FIG. 7A shows a three state switching DC to AC inverter power stage while FIG. 7B shows characteristic waveforms. The power stage is similar to the two state system with the exception that the filter inductor L constituent of output filter 501 now needs only half the inductance of that for a two state system to achieve the same output ripple. The drive circuits are changed so that now the side of the bridge allocated to low speed switching Q5, Q6 is enabled by signal LS and its compliment LS' and that associated with high speed switching, Q7, Q8 is enabled by signal HS and its compliment HS'. The waveform at point 'F' 506 is a square wave at the low output frequency whereas the waveform at 'G' 507 represents alternate positive and negative pulse width modulated half cycles. The waveform generated 508 when waveform 506 and waveform 507 are added together and low pass filtered by filter 501 is a low frequency sine wave 509.

In practice the waveform at 'F' 506 is not a pure square wave but includes a few high frequency switching pulses at each positive to negative and negative to positive transition in order to cover the control circuit's rapid change of pulse width modulation requirement from mostly turned on to mostly turned off, and vice versa, in a very short time.

Figure 8A:
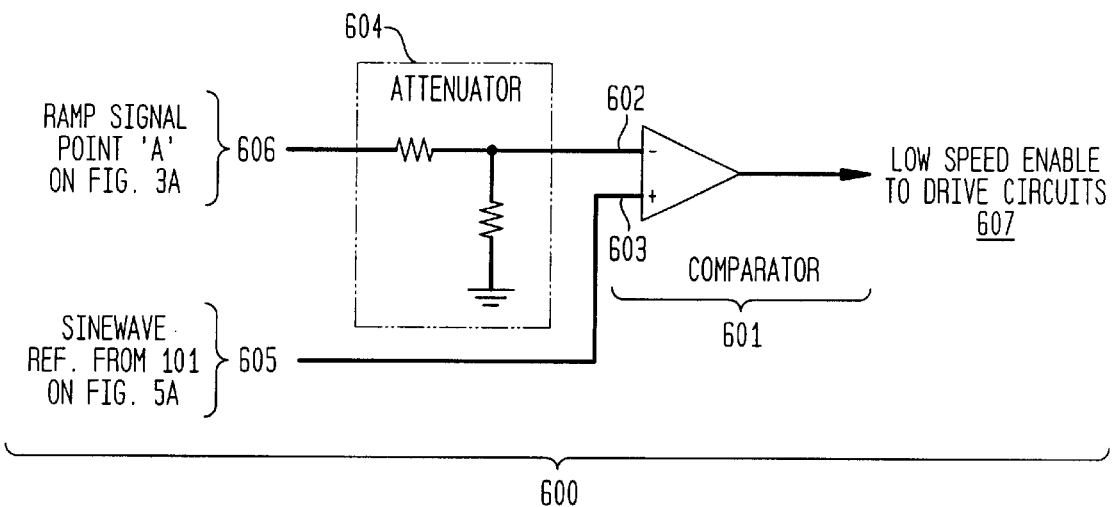
FIG. 8A (FIG. 8A) depicts a schematic of the low frequency drive used in said three state modulation circuit.
Figure 8B:
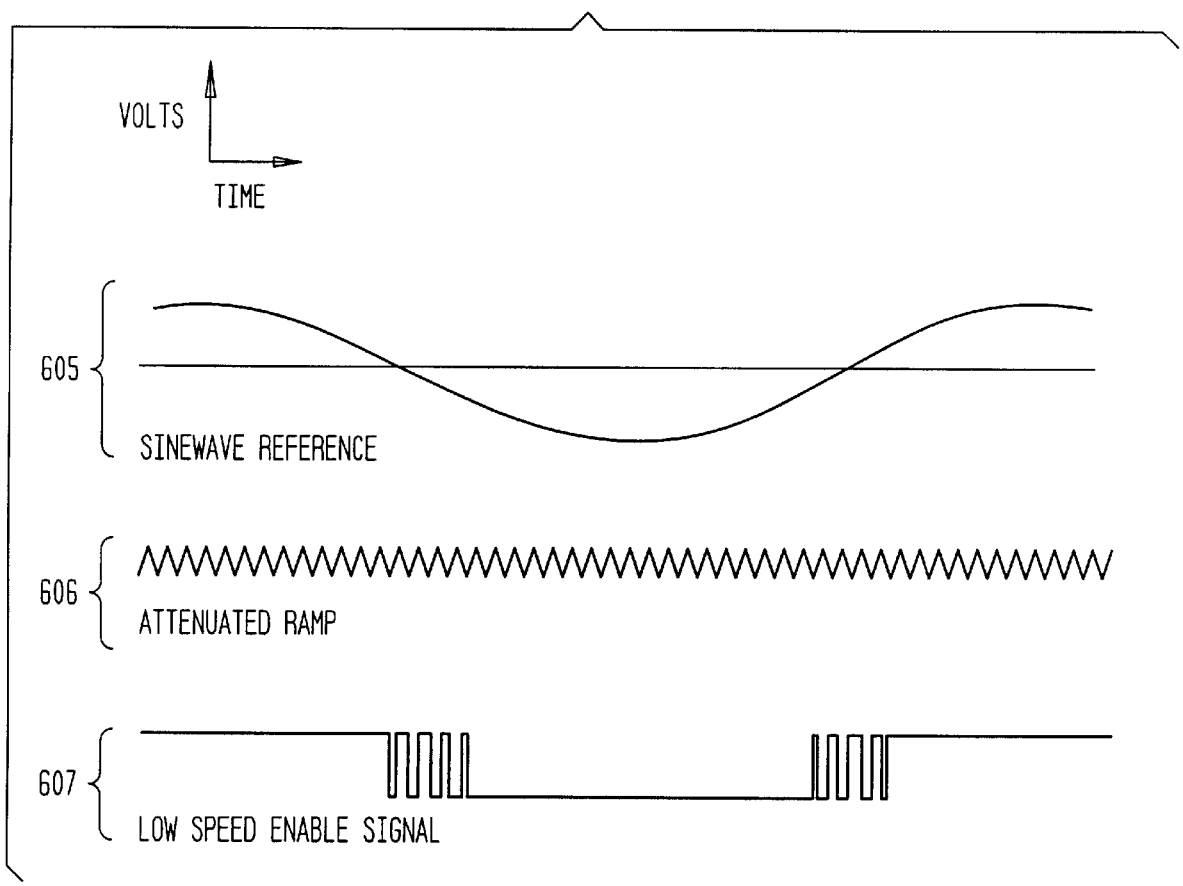
FIG. 8B (FIG. 8B) depicts waveforms exemplary of said low frequency drive circuit.

FIG. 8A depicts a schematic of the low speed drive 600 which provides signals LS and LS', while FIG. 8B depicts characteristic waveforms. The sine wave reference signal 605 (see FIG. 6A, sine wave generator 101) is connected to one side 603 of a voltage comparator 601 and a ramp signal 606 attenuated by attenuator 604 is connected from the slope modulator (see FIG. 6A, point 'A') to the other input 602. The resulting output is a square wave 607 with high frequency bursts as the signal changes state. The bursts are automatically pulse width modulated and are synchronized with the high speed switching. Varying the attenuator varies the width of the high frequency burst and the duration of the burst is determined by the slew rate of the control circuits at low frequency zero crossings.

The sine wave compression circuit has two major components; one to measure the DC voltage, and the other to vary the sine wave voltage.

A simple inverter configuration having a half bridge configuration with both positive and negative DC inputs with commons connected to the output neutral does not have DC levels that are referenced to the inverter control. In this case the DC input voltage reference can be a resistive divider. Such an inverter unfortunately incurs the highest switching losses and high voltage stress on the switching components and so is seldom used. Other configurations such as full bridge two state and three state systems have DC input voltages that do not have a simple relationship to the AC output neutral; the common point for the sine wave reference. It is possible to derive a DC signal proportional to the DC input, but it is simpler to design an isolated measuring system.

Figure 9:
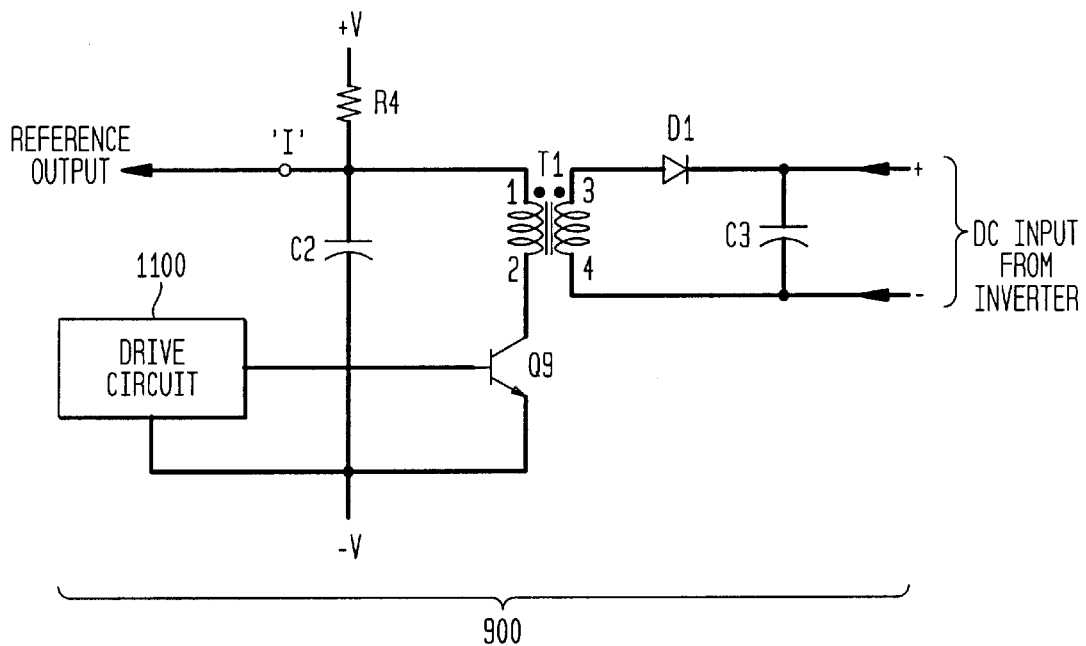
FIG. 9 (FIG. 9) depicts a combination schematic and block diagram of an isolated voltage sense circuit in accordance with the present invention.

FIG. 9 depicts the isolated voltage sense 900. The active element Q9 is driven at high frequencies, typically 100 kHz by a drive circuit 1100 having a 50-50 duty cycle. Transformer T1 has a square wave across its primary winding 1-2.

When output diode D1 is disconnected and T1 magnetizing inductance is made high the current drawn by Q9 is very low, consequently the voltage drop across sense resistor R4 is low and the voltage at 'I' is approximately the control supply voltage +V.

When diode D1 is connected and the DC inverter supply voltage is zero T1 secondary is effectively shorted out when Q9 is tuned on. Transformer T1 is wound for low loss and low leakage inductance so the short across the secondary 3-4 is transferred back to the primary 1-2. The short 1-2 in series with turned on transistor Q9 pulls point 'I' down to the control supply negative voltage.

As the DC input voltage to the inverter is raised with D1 connected, T1 secondary voltage rise is controlled by the clamping action D1. At the same time the voltage at point 'I' rises by an amount determined by the transformer ratio 3-4 to 1-2. Thus the voltage at 'I' is proportional to the inverter DC input.

Figure 10:
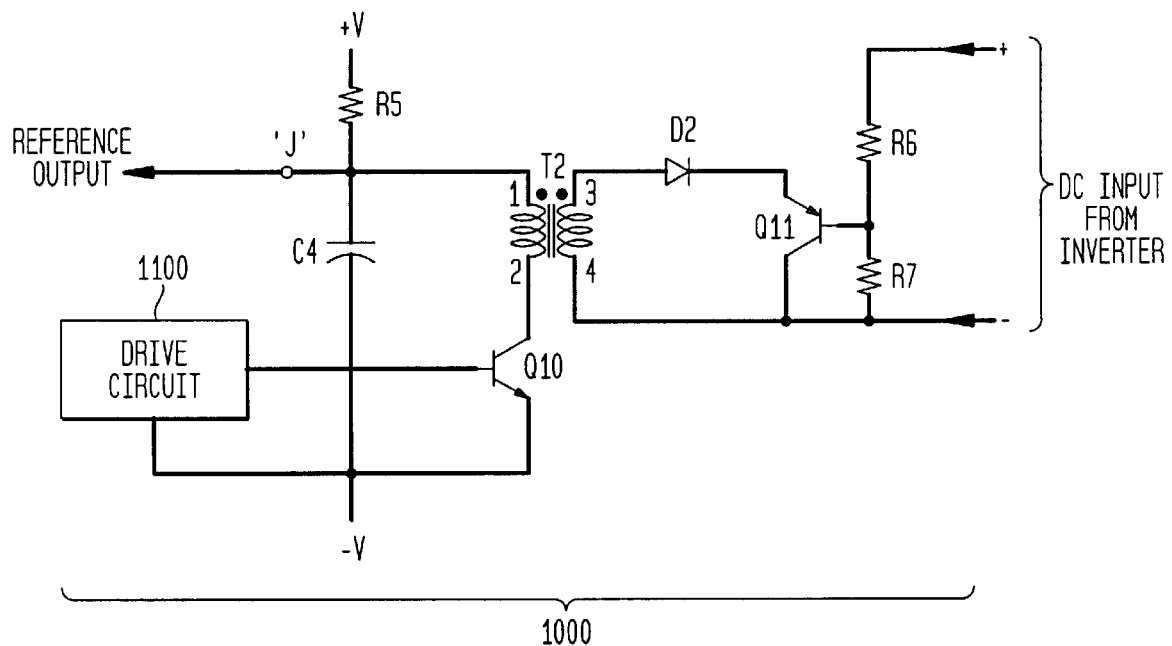
FIG. 10 (FIG. 10) depicts a combination schematic and block diagram of an alternate embodiment of the isolated voltage sense capable of working at high voltages in accordance with the present invention.

In practice the high voltage input to the inverter, 200 volts or so, leads to difficulties in achieving a workable leakage inductance in transformer T1. FIG. 10 shows a variant 1000 of the circuit 900 in which the voltage to be sensed is first attenuated by R6 and R7 and then an emitter follower Q11 is used to catch the secondary clamp diode D2. The voltage at 'I' is now the ratio R3 to R2+R3 multiplied by T2 primary to secondary ratio. The drive circuit 1100 serves the identical purpose as in FIG. 9. Components R5, C4 and Q10 serve identical purpose to R4, C2 and Q9 in FIG. 9 but may have different component values.

Figure 11:
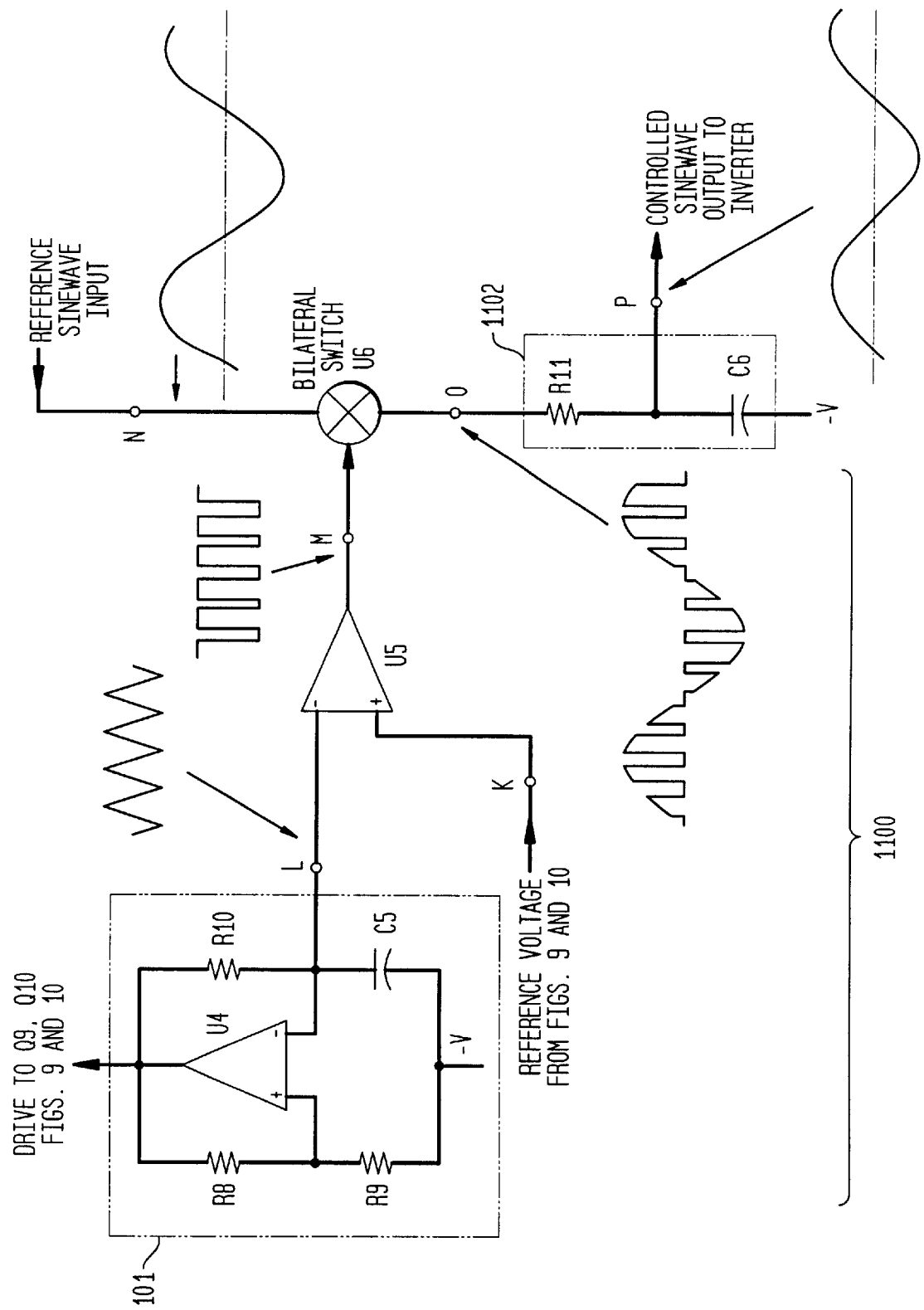
FIG. 11 (FIG. 11) depicts a schematic of the sine wave compression circuit in accordance with the present invention.

The sine wave compression circuit pulse width modulates the sine wave reference and then low pass filters the result to produce a reduced voltage but undistorted output. This circuit 1100 is depicted schematically in FIG. 11.

Comparator U4, together with R8, R9, R10 and C5 act as a 100 kHz multivibrator 1101. The digital output serves to drive the switching transistor, Q9 or Q1O on FIGS. 9 and 10, respectively. The sawtooth signal is connected to the negative input of a second comparator U5. The U5 positive input 'K' is connected to the reference signal, either point 'I' on FIG. 9 or point 'J' on FIG. 10, depending on the voltage level used.

Circuit values are adjusted so that when the inverter DC input voltage is as high or higher than that required for a full sine wave output the voltage at 'K' is greater than the positive excursion of the ramp signal at 'L'. Under these conditions U5 output is positive and a bilateral switch U6 connects the sine wave reference at 'N' to the low pass filter 1102 comprising R11 and C6 then out to the inverter at 'P'.

When the DC voltage to the inverter is less than that for a full sine wave output the reference 'K' is less than the peak positive value of the ramp signal at 'L', and the output of U2 at 'M' is a pulse width modulated signal. This in turn pulse width modulates the reference at 'N' by periodically disabling switch U3 to produce the signal at 'O'. Low pass filtering by 1102 smooths out the chopped sine wave to provide a reduced amplitude reference. Careful component selection allows the sine wave reference output to be made proportional to the inverter DC input voltage when it is below the critical level.

While the present invention has been described with reference to one or more preferred embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention.

What I claim is:

1. A DC to AC inverter control system comprising:

input means accepting a DC signal;

output means for providing an AC output signal having a voltage amplitude and a current amplitude;

a power input stage coupled to said input means comprising switching transistors and commutating diodes;

output filter means interfaced with said power input stage to convert output of said power input stage to an AC sine wave;

multivibrator structure for generating a square wave of variable duty cycle;

drive means coupled to said multivibrator means for controlling said switching transistors;

sine wave generation means for producing a sine wave reference signal, said sine wave reference signal having a voltage amplitude indicative of the desired AC voltage amplitude of said AC output signal;

error means for comparing the voltage amplitude of said AC output signal to said sine wave reference signal voltage amplitude and thereafter producing an error signal having a current amplitude;

difference means for comparing said current amplitude of said AC output signal to said current amplitude of said error signal and thereafter producing a difference signal;

sawtooth generator means for generating a sawtooth signal; and modulation means responsive to said difference signal and coupled to said sawtooth generator means and said multivibrator structure to modulate the slope of said sawtooth signal, wherein said sawtooth signal varies the duty cycle of said square wave generated by said multivibrator structure.

2. An inverter control system in accordance with claim 1, wherein positive and negative current sources control said multivibrator.

3. An inverter control system in accordance with claim 2, wherein said positive and negative current sources are controlled by a plurality of logic inverters.

4. An inverter control system in accordance with claim 1, wherein said drive means of said switching transistors operate in a three state switching arrangement.

5. An inverter control system in accordance with claim 1, wherein said sine wave reference signal is replaced by a DC signal.

6. Sine wave reference compression means for use with a DC to AC inverter, said inverter outputting a desired AC signal, said sine wave reference means comprising:

inverter means for converting a DC signal to an AC signal further comprising a reference input means to receive a second AC reference signal indicative of said desired AC signal;

isolated reference input means for determining voltage amplitude of said DC signal;

reference output means for receiving a first sine wave reference signal indicative of said desired AC signal;

analysis means for analyzing the amplitude of said DC signal to determine its sufficiency to generate said desired AC signal;

attenuation means, coupled to said analysis means, to attenuate said first sine wave reference signal in cases of insufficient amplitude of said DC signal, wherein said cases said attenuation means generates said second AC reference signal, wherein said second AC reference signal is substantially identical to said first sine wave reference signal with attenuated amplitude; and output means coupled to said reference input means and said attenuation means for providing said second AC reference signal;

wherein said sine wave compression means function to limit the amplitude of said first AC reference signal in cases of insufficient amplitude of said DC signal to improve the quality of said AC signal by providing said second AC reference signal having reduced amplitude.

7. Sine wave reference compression means in accordance with claim 6, wherein said isolated reference input means comprises:

a drive circuit;

a switching transistor controlled by said drive circuit;

a transformer controlled by said switching transistor;

a DC output reference across the primary of said transformer;

a clamping diode connected at anode to secondary of said transformer;

a filter capacitor connected in series between secondary of said transformer and cathode of said clamping diode; and a DC output across said filter capacitor.

8. Sine wave reference compression means in accordance with claim 7, wherein said filter capacitor is replaced by an emitter follower.

9. A DC to AC inverter comprising:

input means accepting a DC signal;

output means for providing an AC signal having a voltage amplitude and a current amplitude;

a power input stage coupled to said input means comprising switching transistors and commutating diodes;

output filter means interfaced with said power input stage to convert output of said power input stage to an AC sine wave;

multivibrator structure for generating a square wave of variable duty cycle;

drive means coupled to said multivibrator means for controlling said switching transistors;

reference input means to receive a second AC reference signal indicative of the desired AC signal;

isolated reference input means for determining voltage amplitude of said DC signal;

reference output means for receiving a first sine wave reference signal indicative of said desired AC signal;

analysis means, coupled to said input means, for analyzing the amplitude of said DC signal to determine its sufficiency to generate said desired AC signal;

attenuation means, coupled to said analysis means, to attenuate said first sine wave reference signal in cases of insufficient amplitude of said DC signal, wherein said cases said attenuation means generates said second AC reference signal, wherein said second AC reference signal is substantially identical to said first sine wave reference signal with attenuated amplitude;

output structure coupled to said reference input means and said attenuation means for providing said second AC reference signal, wherein the amplitude of said first AC reference signal is limited in cases of insufficient amplitude of said DC signal to improve the quality of said AC signal by providing said second AC reference signal having reduced amplitude;

error means for comparing the voltage amplitude of said AC signal to said second sine wave reference signal voltage amplitude and thereafter producing an error signal having a current amplitude;

difference means for comparing said current amplitude of said second AC output signal to said current amplitude of said error signal and thereafter producing a difference signal;

sawtooth generator means for generating a sawtooth signal; and modulation means responsive to said difference signal and coupled to said sawtooth generator means and said multivibrator structure to modulate the slope of said sawtooth signal, wherein said sawtooth signal varies the duty cycle of said square wave generated by said multivibrator structure.

10. A DC to AC inverter in accordance with claim 9, wherein positive and negative current sources control said multivibrator.

11. A DC to AC inverter in accordance with claim 10, wherein said positive and negative current sources are controlled by a plurality of logic inverters.

12. A DC to AC inverter in accordance with claim 9, wherein said drive means of said switching transistors operate in a three state switching arrangement.

13. A DC to AC inverter in accordance with claim 9, wherein said isolated reference input means comprises:

a drive circuit;

a switching transistor controlled by said drive circuit;

a transformer controlled by said switching transistor;

a DC output reference across the primary of said transformer;

a clamping diode connected at anode to secondary of said transformer;

a filter capacitor connected in series between secondary of said transformer and cathode of said clamping diode; and a DC output across said filter capacitor.

14. A DC to AC inverter in accordance with claim 13, wherein said filter capacitor is replaced by an emitter follower.

* * * * *